(12) United States Patent
Parampottil (10) Patent No.: US 10,165,073 B1
(45) Date of Patent: Dec. 25, 2018

(54) MULTIPLE CONTROLLED-ENVIRONMENT FACILITY INVESTIGATIVE DATA AGGREGATION AND ANALYSIS SYSTEM ACCESS TO AND USE OF SOCIAL MEDIA DATA

(71) Applicant: Securus Technologies, Inc., Dallas, TX (US)

(72) Inventor: Isaac Parampottil, Coppell, TX (US)

(73) Assignee: Securus Technologies, Inc., Carrollton, TX (US)

( * ) Notice: Subject to any disclaimer, the term of this patent is extended or adjusted under 35 U.S.C. 154(b) by 214 days.

(21) Appl. No.: 15/195,317

(22) Filed: Jun. 28, 2016

(51) Int. Cl.
| | | |
|---|---|---|
| H04L 29/08 | (2006.01) |
| H04L 29/12 | (2006.01) |
| H04M 3/42 | (2006.01) |
| G06F 17/30 | (2006.01) |
| G06Q 50/00 | (2012.01) |
| G06Q 50/18 | (2012.01) |

(52) U.S. Cl.
CPC ........ *H04L 67/22* (2013.01); *G06F 17/30867* (2013.01); *G06Q 50/01* (2013.01); *G06Q 50/18* (2013.01); *H04L 61/605* (2013.01); *H04L 67/10* (2013.01); *H04M 3/42059* (2013.01)

(58) Field of Classification Search
CPC ....... H04L 67/22; H04L 67/10; H04L 61/605; G06Q 50/18; G06Q 50/01; G06F 17/30867; H04M 3/42059
See application file for complete search history.

(56) References Cited

U.S. PATENT DOCUMENTS

| | | | |
|---|---|---|---|
| 9,800,721 B2 * | 10/2017 | Gainsboro .......... | H04M 3/2281 |
| 2002/0068582 A1 * | 6/2002 | Zawislak ............ | H04M 3/2281 |
| | | | 455/456.5 |
| 2008/0040781 A1 | 2/2008 | Keiser et al. | |
| 2009/0067587 A1 * | 3/2009 | Rokosky ............. | H04M 3/2281 |
| | | | 379/69 |
| 2012/0262271 A1 | 10/2012 | Torgersrud et al. | |
| 2013/0031176 A1 | 1/2013 | Shih et al. | |
| 2013/0263227 A1 | 10/2013 | Gongaware et al. | |
| 2013/0268589 A1 | 10/2013 | Torgersrud et al. | |
| 2014/0025372 A1 | 1/2014 | Tamura et al. | |
| 2014/0279789 A1 | 9/2014 | Torgersrud | |
| 2014/0379805 A1 * | 12/2014 | Wang .................. | H04L 67/1095 |
| | | | 709/204 |
| 2015/0215254 A1 * | 7/2015 | Bennett ................... | H04L 51/12 |
| | | | 709/206 |
| 2017/0147662 A1 * | 5/2017 | Olligschlaeger ............ | |
| | | | G06F 17/30563 |

* cited by examiner

*Primary Examiner* — Michael A Keller
(74) *Attorney, Agent, or Firm* — Fogarty LLP (57) ABSTRACT

Multiple controlled-environment facility investigative data aggregation and analysis systems and methods capture a telephone number of a controlled-environment facility resident and/or a non-resident associated with the resident, such as by a controlled-environment facility communications management system. The captured telephone number is used to access a social media account of the resident or non-resident and information related to the resident is gathered from the accessed social media account. Gathered information is incorporated into the centralized investigative data aggregation analysis system for analysis, so as to provide investigative leads to users of the multiple controlled-environment facility investigative data aggregation and analysis system, such as via a web-based interface.

24 Claims, 3 Drawing Sheets

MULTIPLE CONTROLLED-ENVIRONMENT FACILITY INVESTIGATIVE DATA AGGREGATION AND ANALYSIS SYSTEM ACCESS TO AND USE OF SOCIAL MEDIA DATA

CROSS-REFERENCE TO RELATED APPLICATION

The specification is related to U.S. patent application Ser. No. 14/133,643, entitled Monitoring of Social Networking Targets Associated with Controlled-Environment Facility, filed Dec. 19, 2013, which is hereby incorporated herein by reference.

TECHNICAL FIELD

This controlled-environment facilities, specifically to multiple controlled-environment facility investigative data aggregation and analysis systems and methods, and particularly to multiple controlled-environment facility investigative data aggregation and analysis system access to, and use of, social media data.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions.

Traditional communication services provided to residents of controlled-environment facilities (such as correctional facilities) include allowing residents (inmates) to place outbound phone calls to non-residents (i.e., persons not committed to a controlled-environment facility). Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

Social networking has emerged as a primary form of communication. Social networking sites provide a platform for communication of information, ideas, and media amongst connected parties. Connections in social networks are typically formed on an invitation basis. Social networking platforms offer a variety of modes of communications between connected parties. For example, connected parties may communicate via private messages, instant messaging, video or voice messaging, etc. Additionally, connected parties may communicate via public or semi-public methods, such as posting text or media to a public forum or page. Public forums can include blogs, podcasts, message feeds, community forum threads, posts to virtual bulletin boards, status updates, location check-ins, timeline, tagging, social media payments, logins, tag, etc.

Controlled-environment facilities typically control and record information related to the various interactions, communications, and/or transactions involving the facilities' residents. For example, in a correctional facility (e.g., a prison or jail), such information may be collected and used for investigative purposes with respect to past, present, and future criminal activities. Accordingly, various exchanges of information, communication, money, goods, etc. may be recorded and stored in one or more electronic databases. Typically, each controlled-environment facility controls its own information database, which is generally not accessible by other facilities.

SUMMARY

The present invention is directed to systems and methods which provide multiple controlled-environment facility investigative data aggregation and analysis. Therein, at least one telephone number of a resident and/or at least one non-resident associated with the resident of a controlled-environment facility is captured, such as by at least one controlled-environment facility communications management system associated with at least one controlled-environment facility. The telephone number of the non-resident may be a telephone number called by the resident and/or may be a telephone number used by the non-resident to communicate with the resident. Additionally or alternatively, the telephone number of the resident or non-resident may be a telephone number listed in a controlled-environment facility database as associated with the resident. In some cases, the non-resident number may be on a pre-approved contact and/or personal allowed number list for the resident.

Captured resident and/or non-resident telephone numbers and identification of residents associated with the non-residents may be received, such as from each controlled-environment facility communications management system, into, for example, a centralized investigative data aggregation and analysis system. At least one social media account of each resident or non-resident may be accessed using a captured telephone number and information related to a respective resident may be gathered from at least one accessed social media account. Only public portions of the social media account(s) may be accessed using the captured telephone number and the information related to the resident is gathered from the public portions of the accessed social media account(s).

Gathered information may be incorporated into the centralized investigative data aggregation for analysis, so as to provide investigative leads resulting from incorporation of the gathered information into the centralized investigative data aggregation to users of the multiple controlled-environment facility investigative data aggregation and analysis system, such as via a web-based interface of the multiple controlled-environment facility investigative data aggregation and analysis system.

The social media account(s) may be further monitored to gather further information related to the resident. Also, information related to contacts of the resident or non-resident maintained by any accessed social media accounts may be gathered to access social media account(s) of such contacts and gather information related to a respective resident therefrom for further incorporation into the centralized investigative data aggregation and analysis system to provide further investigative leads with respect to the resident.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Generally, residents of controlled-environment facilities, particularly inmates of correctional facilities, are restricted in their communications with the public. In many prisons, for example, inmates are only allowed to communicate with approved parties through secure and monitored communication systems provided and maintained by the prison administration or by a third-party contractor associated with the prison administration. Non-residents, with whom residents may communicate may use social media to simply communicate with friends or family. On the other hand, such non-residents may use social media for various nefarious purposes, including perpetrating crimes, promoting crime, boasting about crimes, conspiring to commit crimes, intimidation or taunting of government officials, witnesses, or victims of crimes, etc., with or without reference to the inmate. Such social media accounts may include blogs, business networks, enterprise social networks, forums, microblogs, photo sharing sites, product and/or service review sites, social bookmarking, social gaming, social networks, video sharing sites, virtual worlds, texting/messaging, group texting/messaging, location check-ins, status updates, tags, or the like. Thus, as used herein, "social media" may refer to computer-mediated tools that allow people, or other entities to create, share, and/or exchange information, career interests, ideas, pictures/videos, or the like in virtual communities and networks. Such social media may be stand-alone and (or) built into various applications or sites.

It may be useful for controlled-environment administration or criminal investigators to monitor or review information posted by non-residents associated with an inmate, or in the name of inmates, on social media platforms. Additionally, it may be useful to criminal investigators to determine a list of persons of interest or organizations of interest associated with the inmate. Embodiments of the present systems and methods may monitor social networking targets associated with a controlled-environment facility. In various embodiments, these systems and methods may include determining a social media target associated with a person having association with a controlled-environment facility, monitoring the social media target for an activity event, and providing information to an administrator of the controlled-environment facility in response to the activity event, or the like.

A "multiple controlled-environment facility investigative data aggregation and analysis investigative tool" employed in conjunction with the present systems and methods is an investigative tool that aggregates and analyzes data from multiple sources, including, in accordance with embodiments of the present invention, multiple controlled-environment facilities. This multiple controlled-environment facility investigative data aggregation and analysis investigative tool may take the form of a web-based portal enabling individuals to store and transmit information. Such a system may include forensic tools that analyze communications into and out of controlled-environment facilities to assist law enforcement. Such a multiple controlled-environment facility investigative data aggregation and a data analysis system, such as the THREADS™ system implemented by SECURUS® Technologies, may provide law enforcement with actionable intelligence and focused leads using data collected from various resources, including, in accordance with embodiments of the present systems and methods social media.

Thus, embodiments of the present systems and methods are directed to multiple controlled-environment facility investigative data aggregation and analysis systems and methods, and particularly to multiple controlled-environment facility investigative data aggregation and analysis system access and use of social media data. In accordance with embodiments of the present systems and methods, a telephone number associated with a controlled-environment facility resident and/or a telephone number associated with a non-resident that is associated with the resident is captured, such as by a controlled-environment facility communications management system. The captured telephone number is used to access a social media account of the resident and/or non-resident and information related to the resident is gathered from the accessed social media account. Gathered information is incorporated into the centralized investigative data aggregation analysis system for analysis, so as to provide investigative leads to users of the multiple controlled-environment facility investigative data aggregation and analysis system, such as via a web-based interface. Such leads may contain intentionally or unintentionally displayed or embedded data that may provide investigators with information that can potentially be used to solve crimes or otherwise aid investigators. In accordance with embodiments of the present systems and methods, this could be achieved through a contact posting a picture with a clue such as a person, place or weapon in the picture. Another example could be a message within social media that shows an investigation target checking into a location at a specific time. Further with respect to this example, the target may have checked into a movie theater at a specific time, which may be different than information they may have disclosed to investigators. In a further example, the lead may contain evidence that there is another connection, another contact, that may be associated with a target, or the like.

Thus the present systems and methods provide for integration of multiple controlled-environment facility investigative data aggregation and a data analysis system, such as THREADS™, with social media such as Facebook, Twitter, Instagram, etc. For example, Facebook, Twitter, Instagram, and other social media allow users to use telephone numbers for login purposes. In accordance with embodiments of the present systems and methods, a multiple controlled-environment facility investigative data aggregation and data analysis system automatically presents investigators with social media activity feeds, posts, comments, tweets, messages, as well as access to photos and videos of all the contacts that an inmate may make directly or indirectly.

Figure 1:
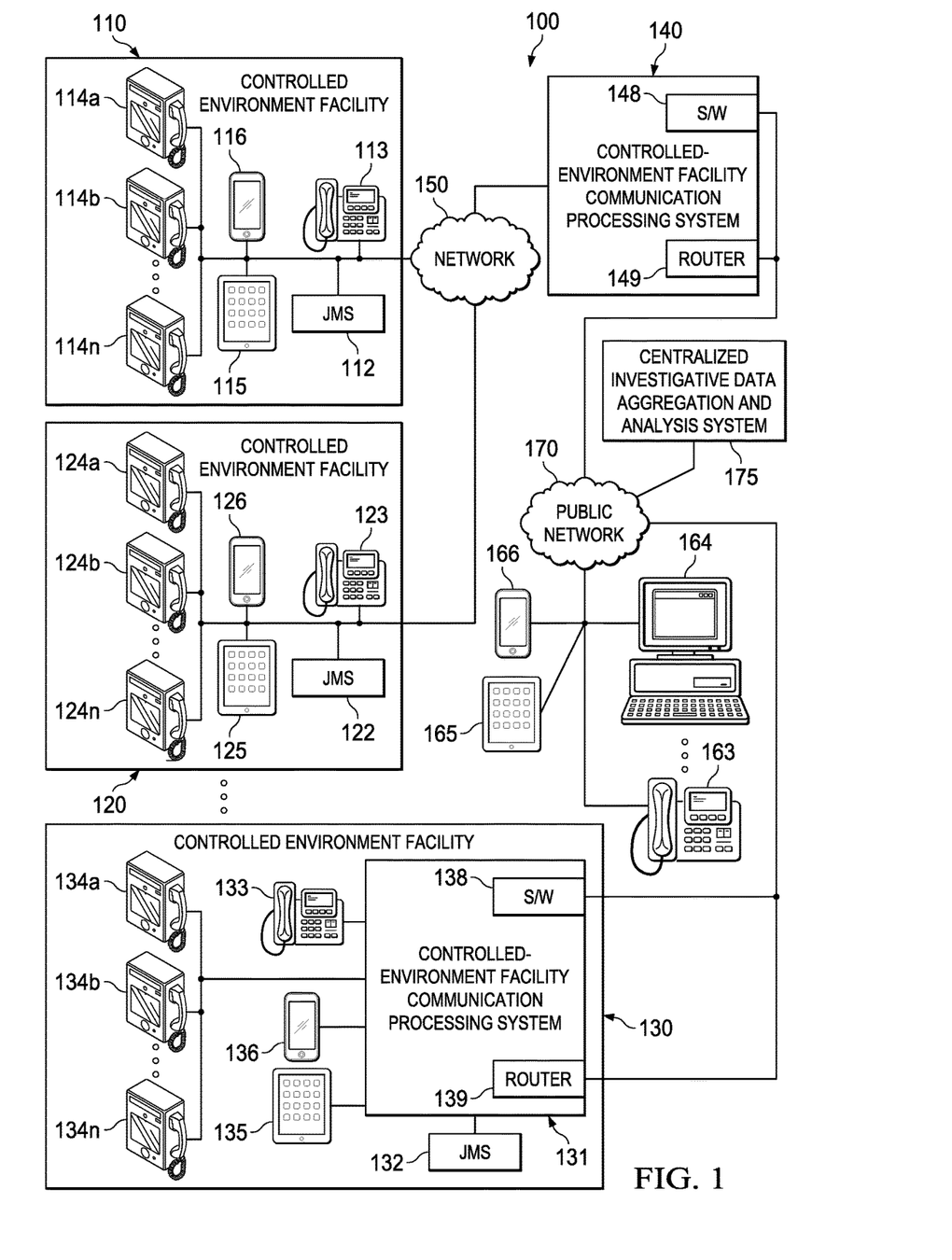
FIG. 1 is a diagrammatic illustration of an example communications environment, wherein an example embodiment of the present systems and methods for gaining access to social media data for use in a multiple controlled-environment facility investigative data aggregation and analysis system is deployed, according to some embodiments.

FIG. 1 is a diagrammatic illustration of an example communications environment 100, wherein an example embodiment of the present systems and methods for gaining access to social media data for use in a multiple controlled-environment facility investigative data aggregation and analysis system is deployed, according to some embodiments, with respect to one or more controlled environment facilities 110, 120, 130 etc. may be deployed, according to some embodiments. Therein, external, centralized communication processing system 140, onsite communication processing system 131, or the like may provide telephone services, videoconferencing, online chat, and other communication services to residents of respective controlled-environment facility 110, 120, 130, etc. As illustrated, in some cases, a communication processing system (131) may be co-located with a controlled-environment facility (130). Alternatively, as also illustrated a communication processing system (140) may be centrally or remotely located, in whole or in part, with respect to one or more controlled-environment facilities (110, 120, etc.), may be connected to such facilities via a public or private network (150) and may provide communication services to such multiple controlled-environment facilities. More generally, however, it should be noted that communication systems 131, 140, etc. may assume a variety of forms, and may be configured to serve a variety of facilities and/or users, whether within or outside of a controlled-environment facility.

In some implementations, wherein the controlled-environment communication system (131) is located within the controlled-environment facility (130), it may have direct access to an Administration Management System (AMS) or Jail Management System (JMS) 132 for garnering information used in accordance with various embodiments of the present systems and methods. In other embodiments, where the (central) controlled-environment facility communication system (140) is located remotely with respect to the controlled-environment facility (110, 120, etc.), access to AMS or JMS 112, 122, etc. may be obtained via a computer network such as, for example, network 150, for gathering information used in accordance with various embodiments of the present systems and methods.

In the context of a correctional facility, the respective JMS or AMS databases may also include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

In some embodiments, the lives of inmates may be electronically managed from booking through release. An AMS or JMS deployed in conjunction with one or more correctional facilities and provides management of various aspects thereof, such as facility management (including tracking inmates from booking through release), staff management (including time and attendance management and personnel dispatching), call management (including placing and blocking calls, accounting for call charges, distance commerce, determining credit worthiness of individuals, establishing and maintaining accounts, and handling purchases of goods and services), and inmate management (including managing inmate information and tracking inmate activity). Other management systems may include public phone companies, cell phone forensics, internet service providers, visitation systems including video and non-video systems, postal services, email services, payment processors and the like.

In addition to providing certain visitation and communication operations, communication processing systems 131 and 140 may attempt to ensure that an inmate's calls, video conferences, online chats, etc. are performed only with non-residents whose identities, devices, email addresses, phone numbers, etc. are listed in that inmate's Personal Allowed Number (PAN) or Pre-Approved Contact (PAC) list. Each inmate's PAN or PAC list may be stored, for example, in a database maintained by respective AMS or JMS 112, 122 or 132, or the like. In addition to PAN or PAC list(s), AMS or JMS 112, 122 or 132 (databases), or the like, may also store inmate or resident profile data (RPD), as well as visitation rules applicable to each inmate, Communication Detail Records (CDRs), or similar records, for resident phone calls, video visitations, texts, online chats, or the like.

Residents may use more-or-less conventional telephones 113, 123, 133, or the like to access certain communication services, under control of respective communication processing system 131, 140, etc. Additionally or alternatively, in some facilities a resident may use a video visitation device 114*a* through 114*n*, 124*a* through 124*n*, 134*a* through 134*n*, or the like, to place voice calls, as well as for video visitation, under control of respective communication processing system 131, 140, etc. Such a video visitation device may be referred to as an Intelligent Facility Device (IFD) (114, 124, 134), which may be a video phone particularly adapted for use in a controlled-environment facility, but which may be used to place voice calls, as well. Alternatively or additionally, IFDs may take the form of, or be used as, a voice phone that may have a touchscreen interface. Generally speaking, IFDs may be disposed in a visitation room, in a pod, as part of a kiosk, etc. Additionally or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an Intelligent Resident Device (IRD), or the like, and in a correctional institution embodiment, as an Intelligent Inmate Device (IID), or the like. As will be appreciated, IIDs, IFDs, or other similar devices, as well as phones 113, 123, 133, etc. have communications capabilities, to enable a party to participate in telephone calls, video visitation sessions (video calls), or the like with other call parties, such as non-residents, under control of respective communication processing system 131, 140, etc.

In some embodiments, IFDs 114, 124, 134, etc. may be implemented as a computer-based system. For example, each of IFD may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, IFDs may be configured to capture a video image of a resident to be transmitted to a non-resident using the camera, and to display a video image of the non-resident to the resident using the display. IFDs may also be configured to capture an audio signal from the resident to be transmitted to a non-resident using the mouthpiece portion of the handset, during video visitation call or during a voice call. Complementarily, the IFD may provide an audio signal from the non-resident to the resident using the earpiece portion of the handset, during such calls. Additionally or alternatively, audio received from the non-resident may be reproduced via a loudspeaker, and audio provided by the resident may be captured via a microphone.

IFDs may be a replacement for typical telephones provided in controlled-environment facilities, such as rehabilitation centers, jails and prisons, utilizing existing facility telephony wiring. While the IFDs are illustrated in FIG. 1 as hardened, wall-mounted devices, IFDs may also take the form of a kiosk-type terminal or the like. In some cases, IFDs may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFDs may replace a typical pay phone found in some facilities and may provide touch screen computer functionality that enables a resident to perform "self-service" tasks such as setting up doctor appointments, scheduling visitation, viewing schedules, and checking the status of his or her case. The intelligent facility device may include an RFID or biometric reader, or the like to enable precise identification of each resident. In addition, the intelligent facility device includes, as noted, a built-in camera and telephone handset to enable a resident to use video conferencing to meet face to face with attorneys, family and friends. In accordance with embodiments of the present systems and methods, IFDs 114, 124, 134, etc. may be employed to facilitate implementation of embodiments of the present systems and methods, and/or to carry out all or certain aspects of embodiments of the present systems and methods.

As noted, IIDs 115, 125, 135, etc. may be tablet computing devices or smartphone/media players 116, 126, 136, etc. adapted and/or approved for use by residents of the respective controlled-environment facility (within the controlled-environment facility) 110, 120, 130, etc. Each IRD may be particularly adapted for use in a controlled-environment. For example, in a correctional institution, jail, or the like, such an BD may be "stripped-down," particularly from the standpoint of what applications programs (apps) are provided or allowed on the BD, and/or connectivity afforded to the IID. By way of example, such an IRD may employ an operating system kernel that has been rebuilt for use in such a tablet computing device in a controlled-environment facility. For example, such an IRD may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility for example limiting the availability of a Wi-Fi signal providing the stream through the placement of wireless access points, antenna directionality of such wireless access points, and/or the like. Also, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on an IRD might include apps of particular interest to residents of the controlled-environment facility. For example, an IID provided to inmates of correctional facilities, might include apps that may be of particular use to an inmate, in general, such as access to a legal research service, or of more specific interest, such as providing an inmate nearing release, access to employment searching apps or the like. Hence, such IIDs may be used to help soon to be released inmates transition. For example, the IID may be used to communicate with a future employer, or the like. As such, IIDs may be sponsored, or otherwise subsidized by organizations or companies, assisting with the transition of inmates into society. As noted, in accordance with embodiments of the present systems and methods, IIDs may be used to communicate with others, such as through phone calls, video calls, or the like. To this end such IIDs (115, 125, 135, 116, 126, 136, etc.) may include a preinstalled, non-removable app to facilitate implementation of embodiments of the present systems and methods, and/or to carry out all or certain aspects of embodiments of the present systems and methods.

To access communications services, a resident may initiate telephone services by lifting the receiver on telephone 113, 123,133, etc. or IFD 114, 124, 134, etc. and/or otherwise initiating a call, such as by launching an applications program (app) on IRD 115, 125, 135, 116, 126, 136, etc. At which time, the resident may be prompted to provide a personal identification number (PIN), other identifying information or biometrics. An interactive voice response (IVR) unit (not shown, but which may be integrated into communications processing system 131 and/or 140, etc.) may generate and play a prompt or other messages to the resident. Under the control of communication processing system 131 and/or 140, etc. the device may be capable of connecting to a non-resident's device (e.g. telephone 163, non-resident computer 164, non-resident tablet computing device 165, non-resident smartphone/media player 166, or the like) across public network 170, such as a publicly switched telephone network (PSTN), an Integrated Services Digital Network (ISDN), Voice-over-IP (VoIP) or packet data network, such as for example the Internet, etc. Network 170 may be the same, or a different network, as network 150. Switch 148, 138, etc. in respective communication processing system 131, 140, etc. may be used to connect calls across a PSTN (i.e. network 170), such as calls from controlled-environment facility telephone 113, 123 or 133 and non-resident telephone 163. Router 149, 139, etc., media gateway functionality, or the like of respective communication system 131, 140, etc. may be used to route data packets associated with a digital call connection, via an Integrated Services Digital Network (ISDN), the Internet, or the like (i.e. network 170). For example, a non-resident party may have a personal or laptop computer 164 with a webcam, or the like, or devices 165 or 166 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. In accordance with various embodiments of the present systems and methods, non-resident's devices, telephone 163, non-resident computer 164, non-resident tablet computing device 165, non-resident smartphone/media player 166, and/or the like, may be disposed in the non-resident's home, place of work, on their person, or the like. Additionally or alternatively the non-resident devices may be disposed in a visitation area of controlled-environment facility 110, 120, 130, etc., which may be within, adjacent to, or remote with respect controlled-environment facility 110, 120, 130, etc., itself.

In accordance with various embodiments of the present systems and methods, a controlled-environment communication apparatus that may carry out capture of non-resident phone numbers may take the form of central and/or onsite controlled-environment facility communication management system 140 and/or 131, respectively. Additionally, or alternatively, as mentioned above, intelligent controlled-environment facility communication devices, such as IFDs 114, 124, 134, etc. and/or residents IIDs 115, 125, 135, 116, 126, 136, etc. may be employed to facilitate implementation of embodiments of the present systems and methods, and/or to carry out certain aspects of embodiments of the present systems and methods, such as capture of non-resident phone numbers. Computer-based IFDs 114, 124, 134, etc. may include programming and/or hardware to implement embodiments of the present systems and methods. This programming may take the form of stored program instructions, programmed firmware, or the like, while hardware might take the form of an Application Specific Integrated Circuit (ASIC), or the like, to carry out such aspects of embodiments of the present systems and methods.

The present multiple controlled-environment facility investigative data aggregation and analysis system may employ the controlled-environment facility communications management systems (131 and 140) associated with at least one controlled-environment facility (110, 120 or 130) for capturing at least one telephone number of non-residents associated with each resident of the associated controlled-environment facility. This telephone number of the non-resident associated with the resident may be a telephone number called by the resident or that the non-resident otherwise used to communication with the resident, such as via the respective controlled-environment facility communications management system 131 or 140 associated with the controlled-environment facility in which the resident resides 110, 120 or 130. For example, the controlled-environment facility communications management system 131 or 140 may capture the called telephone number of the non-resident associated with the resident when the resident calls the non-resident's telephone number. In another example, wherein the captured telephone number is a telephone number used by a non-resident to communicate with the resident, the number may be captured by controlled-environment facility communications management system 131 or 140 when the non-resident calls into a video visitation or other scheduled call, or in similar circumstances. In yet another example the resident or non-resident number may be captured as a result of an illicit call, such as a call from or to a contraband cell phone in the possession of an inmate/resident, to or from the non-resident. In accordance with various embodiments of the present systems and methods, the non-resident's phone number, and/or the resident's phone number, may be a telephone number listed as associated with the resident in a database associated with a respective controlled-environment facility communications management system 131 or 140 (e.g. in a database maintained by respective JMS 112, 122 or 132). For example, the non-resident phone number may be maintained, as a contact number associated with the respective resident, as part of a pre-approved contact and/or personal allowed number list for the resident, as part of a CDR associated with the respective resident, or the like. As another example, the resident's phone number may be a telephone number the resident used prior to the resident's admission to the controlled-environment facility, listed by a respective controlled-environment facility communications management system 131 or 140 (e.g. in a database maintained by respective JMS 112, 122 or 132). To capture such system-maintained resident and non-resident phone numbers respective controlled-environment facility communications management system 134 or 140 (or centralized investigative data aggregation and analysis system 175) may query the JMS database. Alternatively, respective controlled-environment facility communications management system 134 or 140 may query the database upon a request of centralized investigative data aggregation and analysis system 175. The non-resident telephone number may be a wireless/mobile telephone number of a device associated with the non-resident, such as may typically be used by a party to log into a social media account. In any such case, the controlled-environment facility communications management system 131 or 140 (associated JMS 112, 122 or 132, or the like) provides the called or calling non-resident telephone number to centralized investigative data aggregation and analysis system 175.

Embodiments of the present systems and methods employ a secure, web-based portal enabling individuals to store and transmit information, including forensic tools that analyze communications into and out of controlled-environment facilities assists law enforcement. Such a portal may be provided by centralized investigative data aggregation and analysis system 175, which may provide such investigative tools. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web page (e.g. the aforementioned "portal") having menus comprising an investigator dashboard may be provided, to present and facilitate execution of various investigative operations. These investigative tools may log calls (e.g., as CDRs), so that an investigator may research them through an archive and may be provided access to internal and/or external criminal databases and/or other sources of useful information.

Centralized investigative data aggregation and analysis system 175 is, in accordance with embodiments of the present systems and methods, configured to receive captured resident and non-resident telephone numbers and identification of residents associated with the non-residents, from each controlled-environment facility communications management system 131 or 140 (from associated JMS 112, 122 or 132, or the like). Whereupon, the centralized investigative data aggregation and analysis system 175 attempts to access social media account(s) (site(s)) of each resident or non-resident using the captured telephone number, such as via the Internet (public network 170) by searching for the resident or non-resident's social media site for a particular social media provider using the telephone number. This access may be to only public portions of the resident or non-resident's social media account. Nevertheless, centralized investigative data aggregation and analysis system 175 may then gather information related to a respective resident from such accessed social media accounts/sites.

In accordance with embodiments of various centralized investigative data aggregation and analysis system investigative tools, the fact that a call was placed by a particular inmate to a particular known associate may indicate that a criminal act is likely being contemplated, thereby providing a predictive model for investigative reporting. Similarly, social media monitoring may provide similar intelligence in accordance with embodiments of the present systems and methods. Broadcast alerts may be provided to particular individuals upon the occurrence of a predetermined trigger, such as a particular event. The use of predictive models using investigative tools may analyze or identify patterns of various individuals, such as through mention of an inmate in social media accounts of a non-resident, as well as other information available to identify a list of potential suspects for a particular investigation, such as through the use of calling information, purchasing information, e-mail and/or postal mail communications, known associates, known physical attributes (e.g., presence and content of tattoos, hair style, apparel color and style), addresses and/or areas known to particular individuals, particular key words from communications, and/or the like. Hence, gathered information may be incorporated into centralized investigative data aggregation and analysis system 175 so as to provide investigative leads to users of the multiple controlled-environment facility investigative data aggregation and analysis system, such as via a web-based interface provided by the centralized investigative data aggregation and analysis system. For example, centralized investigative data aggregation and analysis system 175 may analyze aggregated data resulting from incorporation of the gathered information to derive such investigative leads.

In some embodiments, the investigative tool may be utilized not only to directly identify and harvest data from a called non-resident's social media accounts, but also to spawn extended or indirect data identification, correlation, and/or harvesting of data, such as through recognizing crossing points or confluence of information aspects and initiating database hops for exploring additional, (e.g., related or relevant) data. Similarly, in accordance with embodiments of the present systems and methods, further social media data may be gathered for aggregation and analysis by centralized investigative data aggregation and analysis system 175 by gathering information related to contacts of the resident and each non-resident maintained on the resident's and non-resident's accessed social media site/account, including, for example, telephone numbers and/or other possible information for each of the contacts that may afford access to view a social media site of the contact or others, such as a login, name, username, handle, account name, or the like. These further telephone numbers and/or further login information may be used to access social media sites/accounts of each contact to gather information related to a respective resident for incorporation into the centralized investigative data aggregation and analysis system. Again, investigative leads resulting from incorporation of the gathered information into the centralized investigative data aggregation and analysis system are provided to users of the multiple controlled-environment facility investigative data aggregation and analysis system, such as via the aforementioned portal. Even further social media data may be gathered for aggregation and analysis by centralized investigative data aggregation and analysis system 175 by gathering information related any subsequent contacts maintained by any accessed social media account, including, for example, telephone numbers and/or other possible login information for each of any subsequent contacts and using these further phone numbers and/or this login information to access any social media accounts of these subsequent contacts to gather resident information for incorporation into the centralized investigative data aggregation and analysis system to provide further leads.

In accordance with embodiments of the present systems and methods, these investigative tools may similarly monitor aspects of an inmate's activities for use in an intelligence role. For example, centralized investigative data aggregation and analysis system 175 may continue to monitor accessed social media sites/accounts of each non-resident to gather further information related to a respective resident. Thereby, embodiments of the present systems and methods may also monitor the social media target for an activity event. For example, the activity event is a posting of new information to the social media target, posting of new information comprising at least one of a predetermined set of key words, or the like. centralized investigative data aggregation and analysis system 175 may be configured to monitor the social media target. For example, a social media monitoring engine, or the like of centralized investigative data aggregation and analysis system 175 may subscribe to, follow, create a contact association, or otherwise automatically receive information posted on the social media target. In one particular example, such a social media monitoring engine may add an RSS feed from a blog. In another example, the social media monitoring engine may follow a news feed on a real time information feed platform. In still another example, the social media monitoring engine may add a personal profile page as a contact and receive updates therefrom. In still a further example, the social media monitoring engine may interface the social media platform through a backend access portal, or may receive updates provided by an administrator of the social media platform in response to, for example, a request or warrant.

In accordance with embodiments of the present systems and methods, the centralized investigative data aggregation and analysis system 175 may perform an automated crawl to retrieve information posted on the social media target. In still another embodiment, centralized investigative data aggregation and analysis system 175 may provide a user interface (which may or may not be a part of the aforementioned portal) for facilitating a live agent with retrieving information from the social media target. In such an embodiment, centralized investigative data aggregation and analysis system 175 may provide, for example, user interface with links to a set of social media targets. In another embodiment, the user interface may include instructions for the live agent. Instructions may include a description of one or more types of information of interest. The instruction may also include directions for obtaining and storing or reporting the information posted on the social media target.

In accordance with embodiments of the present systems and methods centralized investigative data aggregation and analysis system 175 may generate one or more records of information obtained from the social media target. Records may be stored in a data storage device. Records in the data storage device may be organized according to a database scheme, such as for use by the centralized investigative data aggregation and analysis system 175. This data may be filtered according to one or more filtering criteria. For example, the filtering criteria may include information that references the subject resident/inmate and/or that includes certain predefined key words which are indicative of criminal conduct, or the like. Examples of such terms may include "shot," "beat," "rape," "stole," etc. One of ordinary skill will recognize additional terms which may be used for filtering criteria. One of ordinary skill will also recognize additional filtering criteria which may be implemented according to the present embodiments, including filtering according to a time period, filtering according to a social media platform, and filtering according to a name of other persons or any of a number of organizations.

Figure 2:
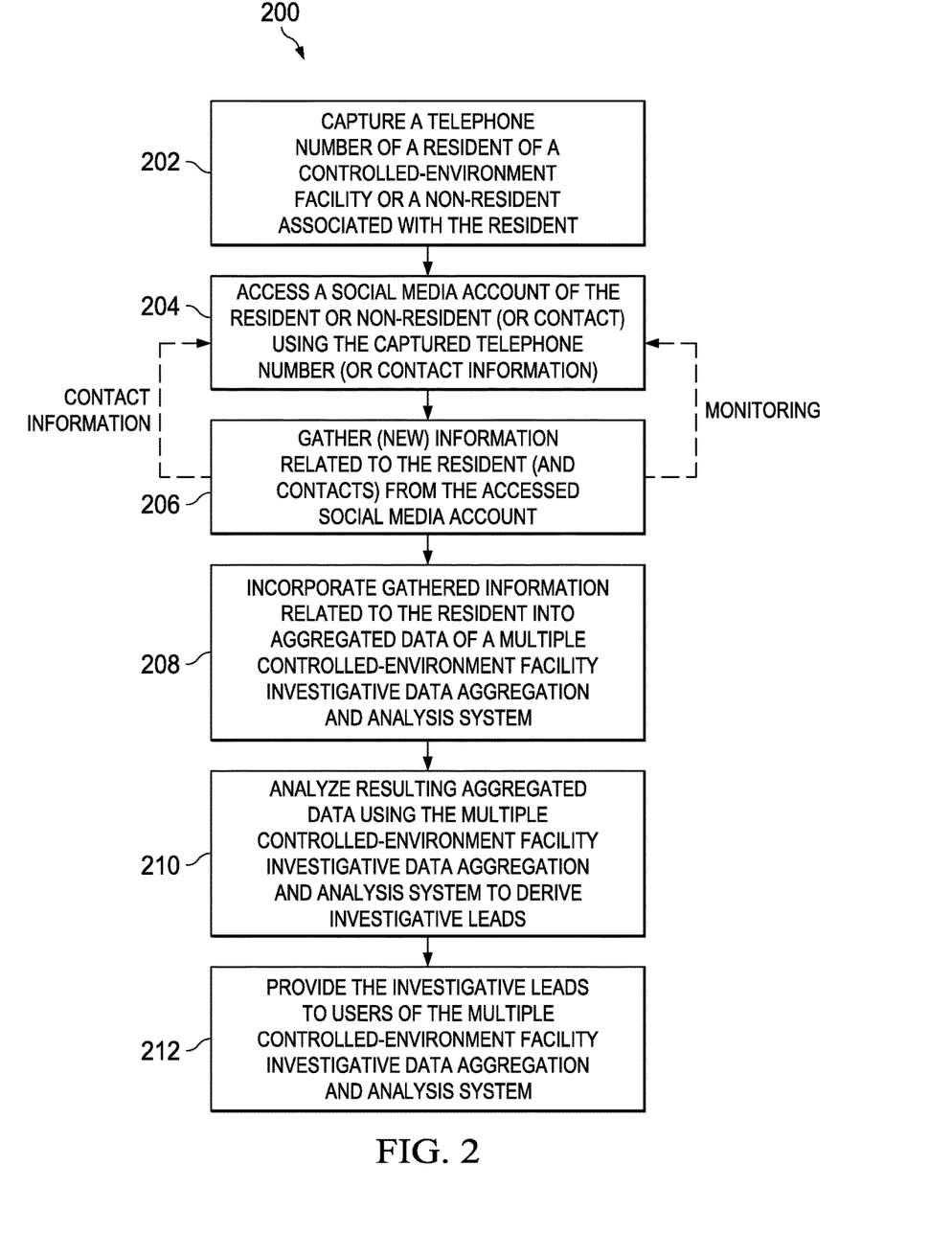
FIG. 2 is a flowchart of an example investigative process for gaining access to social media data for use in a multiple controlled-environment facility investigative data aggregation and analysis system, in accordance with some embodiments.

FIG. 2 is a flowchart of example investigative process 200 for gaining access to social media data for use in a multiple controlled-environment facility investigative data aggregation and analysis system, in accordance with some embodiments. Hence, process 200 may be a multiple controlled-environment facility investigative data aggregation and analysis system implemented process, wherein at least one telephone number associated with a controlled-environment facility resident and/or a telephone number associated with a non-resident associated with the resident is captured at 202. As noted, the non-resident telephone number may be a wireless/mobile telephone number of a device associated with the resident or non-resident, such as may typically be used by a party to log into a social media account. The telephone number of the non-resident associated with the resident of a controlled-environment facility may be a telephone number called by the resident, or which the non-resident used to communicate with the resident. This non-resident telephone number may have been so used by the resident and/or the non-resident via a controlled-environment facility communications management system (131 or 140) associated with a multiple controlled-environment facility investigative data aggregation and analysis system participating controlled-environment facility (110, 120 or 130) in which the resident resides. This controlled-environment facility communications management system may capture the telephone number at 202 and in accordance with some embodiments may provide it to a centralized investigative data aggregation and analysis system (175) of the multiple controlled-environment facility investigative data aggregation and analysis system. In some embodiments the non-resident phone numbers may be captured at 202 from a list of telephone numbers maintained by a database (of JMS 112, 122 or 132), as associated with the resident. As noted, the resident-associated telephone number may be listed as a number the resident acquired, prior to admission to the controlled-environment facility. The non-resident phone number may be maintained, as a contact number associated with the respective resident, as part of a pre-approved contact and/or personal allowed number list for the resident, as part of a CDR associated with the respective resident, or the like. Such a listed resident or non-resident phone number may be "captured" at 202 by querying the controlled-environment facility database to ascertain or otherwise retrieve or glean the phone number from the database.

At 204 at least one social media account of the resident or non-resident may be accessed, such as via the Internet, using the captured telephone number and information related to the resident may be gathered from the accessed social media account/site, at 206. For example, public portions of the social media account(s) of the resident or non-resident may be accessed at 204 using the captured telephone number and information related to the resident is gathered at 206 from these public portions of the accessed social media account(s) of the resident or non-resident, without a need for a warrant, exigent circumstances, or the like. As noted, the social media account(s) may include blogs, business networks, enterprise social networks, forums, microblogs, photo sharing sites, product and/or service review sites, social bookmarking, social gaming, social networks, video sharing sites, virtual worlds, texting/messaging, group texting/messaging, location check-ins, status updates, tags, or the like. It may be useful for controlled-environment administration or criminal investigators to monitor or review information posted by such non-residents associated with an inmate, or in the name of inmates, on social media platforms. A further aspect of gathering information, such as at 206, may call for monitoring (such as by periodically re-accessing) the accessed media accounts of each non-resident to gather further information related to a respective resident, such as in the manner described in detail above. For example, social media monitoring engine, or the like (such as may be a part of centralized investigative data aggregation and analysis system 175) may monitor the social media target for an activity event. If new activity is discovered, an event alert may be triggered and/or the new data gathered in accordance with embodiments of the present systems and methods at 206. Otherwise, the social media monitoring engine may continue to monitor the social media target.

Information gathered at 206 may include information related to contacts of the resident or each non-resident maintained by the accessed social media account(s) of the resident or each non-resident, including, for example, telephone numbers and/or other possible information for each of the contacts that may afford access to view a social media site of the contact or others, such as a login, name, username, handle, account name, or the like for each of the contacts. These phone numbers and/or login information may be used to access social media accounts of each contact for gathering further (public) information related to a respective resident, including phone numbers and/or login information of further contacts for accessing still further social media accounts to gather still further (public) information related to the respective resident.

At 208 any gathered information may be incorporated into aggregated data of the multiple controlled-environment facility investigative data aggregation and analysis system and the resulting aggregated data analyzed at 210, using the multiple controlled-environment facility investigative data aggregation and analysis system to derive investigative leads. At 212 these investigative leads resulting from the aggregated data is provided (i.e. made available) to users of the multiple controlled-environment facility investigative data aggregation and analysis system, such as via the aforementioned portal (i.e. via a web-based interface of the multiple controlled-environment facility investigative data aggregation and analysis system).

Figure 3:
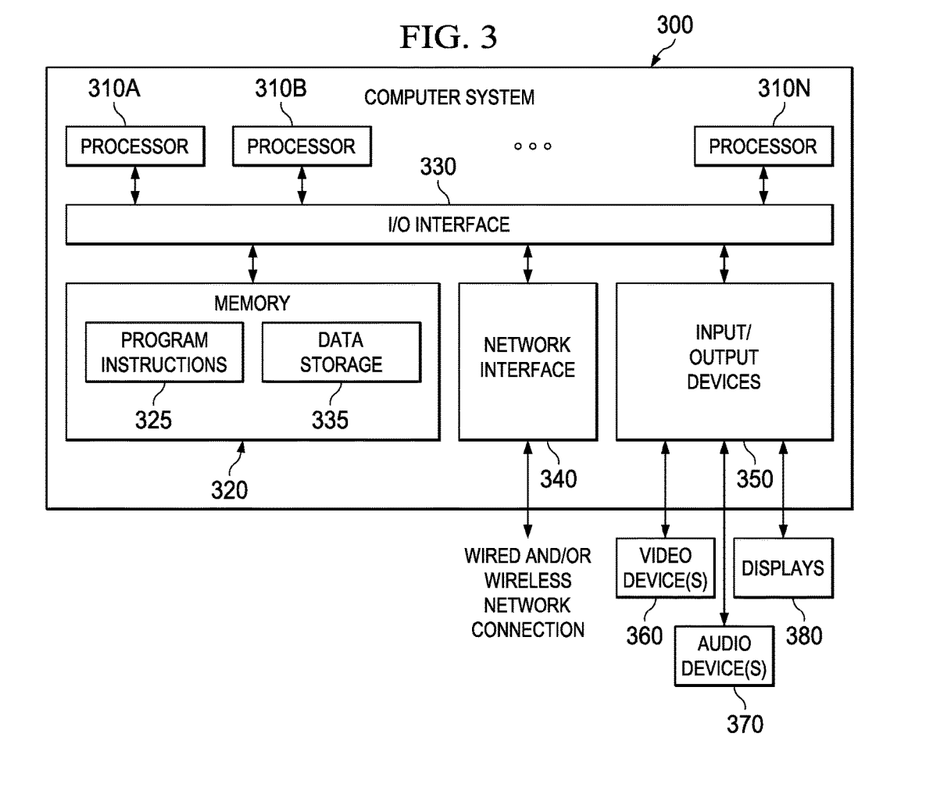
FIG. 3 is a block diagram of a computer system, device, station, or terminal configured to implement various techniques disclosed herein, according to some embodiments.

Various elements of the present investigative systems and methods for gaining access to social media data for use in a multiple controlled-environment facility investigative data aggregation and analysis system may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware. Thus, embodiments of the present investigative systems and methods for gaining access to social media data for use in a multiple controlled-environment facility investigative data aggregation and analysis system, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200, or the like, described above with respect to FIGS. 1 and 2, and/or a computer system such as computer system 300 may be used as, or as part of, one or more of controlled environment facility communications management systems 131 and/or 140; JMSs 112, 122 and 132; centralized investigative data aggregation and analysis system 175; controlled-environment facility resident communications devices 113 through 116, 123 through 126, and 133 through 136; non-resident communications devices 163 through 166; and/or the like. In various embodiments two or more of these computer systems may be configured to communicate with each other in any suitable way, such as, for example, via a network. For example, in FIG. 1, centralized investigative data aggregation and analysis system 175 is illustrated as communicating with controlled-environment facility communications management systems 131 and 140, via public network 170, which may be the Internet. Further, users of the present investigative data aggregation and analysis system may communicate therewith via public network 170 (e.g. the Internet) or the like.

As illustrated, example computer system 300 includes one or more processors 310 coupled to a system memory 320 via an input/output (I/O) interface 330. Example computer system 300 further includes a network interface 340 coupled to I/O interface 330, and one or more input/output devices 350, such as video device(s) 360 (e.g., a camera), audio device(s) 370 (e.g., a microphone and/or a speaker), and display(s) 380. Computer system 300 may also include a cursor control device (e.g., a mouse or touchpad), a keyboard, etc. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 and 2, above, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-readable medium may include any tangible or non-transitory storage media or memory media such as magnetic or optical media—e.g., disk or CD/DVD-ROM coupled to computer system 300 via I/O interface 330, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In some embodiments, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any suitable protocol, timing or other data transformations to convert data signals from one component (e.g., system memory 320) into a format usable by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments, some or all of the functionality of I/O interface 330, such as an interface to system memory 320, may be incorporated into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 3, memory 320 may include program instructions 325, configured to implement certain embodiments described herein, and data storage 335, comprising various data accessible by program instructions 325. In an embodiment, program instructions 325 may include software elements corresponding to one or more of the various embodiments illustrated in the above figures. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A multiple controlled-environment facility investigative data aggregation and analysis system comprising:
  at least one controlled-environment facility communications management system, each at least one controlled-environment facility communications management system associated with at least one controlled-environment facility and comprising at least one processor and memory coupled to the at least one processor, wherein the memory stores program instructions, and wherein the program instructions are executable by the at least one processor to:
  capture at least one telephone number associated with a controlled-environment facility resident and/or at least one telephone number of at least one non-resident associated with the resident; and
a centralized investigative data aggregation and analysis system comprising at least one processor and memory coupled to the at least one processor, wherein the memory stores program instructions, and wherein the program instructions are executable by the at least one processor to:
  receive, from each controlled-environment facility communications management system, captured resident and non-resident telephone numbers and identification of the residents associated with the non-residents;
  access at least one social media account of each resident or non-resident using a captured telephone number;
  gather information related to a respective resident from at least one accessed social media account;
  incorporate gathered information into the centralized investigative data aggregation and analysis system; and
  provide investigative leads resulting from incorporation of the gathered information into the centralized investigative data aggregation and analysis system to users of the multiple controlled-environment facility investigative data aggregation and analysis system.

2. The multiple controlled-environment facility investigative data aggregation and analysis system of claim 1, wherein the centralized investigative data aggregation and analysis system is further configured to analyze aggregated data resulting from incorporation of the gathered information into the centralized investigative data aggregation and analysis system to derive the investigative leads.

3. The multiple controlled-environment facility investigative data aggregation and analysis system of claim 1, wherein the centralized investigative data aggregation and analysis system is further configured to provide the investigative leads to the users via a web-based interface provided by the centralized investigative data aggregation and analysis system.

4. The multiple controlled-environment facility investigative data aggregation and analysis system claim 1, wherein at least one telephone number of the non-resident is a telephone number called by the resident.

5. The multiple controlled-environment facility investigative data aggregation and analysis system claim 1, wherein at least one telephone number of the non-resident is a telephone number used by a non-resident to communicate with the resident.

6. The multiple controlled-environment facility investigative data aggregation and analysis system of claim 1, wherein the at least one telephone number associated with a controlled-environment facility resident and/or at least one telephone number of at least one non-resident is a telephone number listed as associated with the resident in a database associated with one of the at least one controlled-environment facility communications management systems.

7. The multiple controlled-environment facility investigative data aggregation and analysis system of claim 6, wherein the at least one telephone number of the non-resident listed in the database associated with one of the at least one controlled-environment facility communications management systems is on a pre-approved contact and/or personal allowed number list for the resident maintained in the database associated with the one controlled-environment facility communications management system.

8. The multiple controlled-environment facility investigative data aggregation and analysis system of claim 1, wherein the centralized investigative data aggregation and analysis system is configured to access public portions of the at least one social media account using the captured telephone number and gather information related to the resident from the public portions of the at least one accessed social media account.

9. The multiple controlled-environment facility investigative data aggregation and analysis system of claim 1, wherein the centralized investigative data aggregation and analysis system is further configured to monitor the at least one social media account to gather further information related to a respective resident from the at least one accessed social media account.

10. The multiple controlled-environment facility investigative data aggregation and analysis system of claim 1, wherein the centralized investigative data aggregation and analysis system is further configured to:
  gather information related to contacts of each non-resident maintained by the at least one accessed social media account;
  access at least one social media account of each contact using gathered information related to each contact;
  gather information related to a respective resident from at least one accessed social media account of each contact;
  incorporate gathered information from the at least one accessed social media account of each contact into the centralized investigative data aggregation and analysis system; and
  provide investigative leads resulting from incorporation of the gathered information from the at least one accessed social media account of each contact into the centralized investigative data aggregation and analysis system to users of the multiple controlled-environment facility investigative data aggregation and analysis system.

11. The multiple controlled-environment facility investigative data aggregation and analysis system of claim 10, wherein the centralized investigative data aggregation and analysis system is further configured to:
  gather information related to any subsequent contacts maintained by any accessed social media account
  access any social media accounts of subsequent contacts using gathered information related to each subsequent contact;
  gather information related to a respective resident from any accessed social media accounts of any subsequent contacts;
  incorporate gathered information from any accessed social media account into the centralized investigative data aggregation and analysis system; and
  provide investigative leads resulting from incorporation of the gathered information from any accessed social media accounts into the centralized investigative data aggregation and analysis system to users of the multiple controlled-environment facility investigative data aggregation and analysis system.

12. The multiple controlled-environment facility investigative data aggregation and analysis system of claim 1, wherein the at least one social media account of the resident or non-resident includes at least one of a blog, business network, enterprise social network, forum, microblog, photo sharing, group message, message, location check-in, status update, product and/or service review, social bookmarking, social gaming, social network, video sharing, virtual world and/or tag.

13. A multiple controlled-environment facility investigative data aggregation and analysis system implemented method comprising:
   capturing, by at least one controlled-environment facility communications management system, at least one telephone number associated with a controlled-environment facility resident and/or at least one telephone number of a non-resident associated with the resident;
   accessing, by a centralized investigative data aggregation and analysis system, at least one social media account of the resident or a non-resident using a captured telephone number;
   gathering, by the centralized investigative data aggregation and analysis system, information related to the resident from at least one accessed social media account;
   incorporating gathered information, by the centralized investigative data aggregation and analysis system, into aggregated data of the multiple controlled-environment facility investigative data aggregation and analysis system;
   analyzing resulting aggregated data, by the centralized investigative data aggregation and analysis system, using the multiple controlled-environment facility investigative data aggregation and analysis system to derive investigative leads; and
   providing, by the centralized investigative data aggregation and analysis system, the investigative leads resulting from the aggregated data available to users of the multiple controlled-environment facility investigative data aggregation and analysis system.

14. The method of claim 13, wherein at least one telephone number of the non-resident is a telephone number called by the resident.

15. The method of claim 13, wherein at least one telephone number of the non-resident is a telephone number used by the non-resident to communicate with the resident.

16. The method of claim 13, wherein at least one telephone number of the non-resident is a telephone number listed in a controlled-environment facility database as associated with the resident.

17. The method of claim 16, wherein the at least one telephone number of the non-resident listed in the controlled-environment facility database is on a pre-approved contact and/or personal allowed number list for the resident.

18. The method of claim 13, wherein public portions of the at least one social media account are accessed using the captured telephone number and information related to the resident is gathered from the public portions of the at least one accessed social media account.

19. The method of claim 13, further comprising monitoring the at least one social media account to gather further information related to the resident from the at least one accessed social media account.

20. The method of claim 13, further comprising:
   gathering information related to contacts of the resident or non-resident maintained by the at least one accessed social media account;
   accessing at least one social media account of each contact using gathered information related to each contact;
   gathering information related to a respective resident from at least one accessed social media account of the contacts;
   incorporating gathered information from the at least one accessed social media account of each contact into the centralized investigative data aggregation and analysis system; and
   providing investigative leads resulting from incorporation of the gathered information from the at least one accessed social media account of each contact into the centralized investigative data aggregation and analysis system to users of the multiple controlled-environment facility investigative data aggregation and analysis system.

21. The method of claim 20, further comprising:
   gathering information related to any subsequent contacts maintained by any accessed social media account;
   accessing any social media accounts of subsequent contacts using gathered information related to the subsequent contacts;
   gathering information related to a respective resident from any accessed social media accounts of any subsequent contacts;
   incorporating gathered information from any accessed social media account into the centralized investigative data aggregation and analysis system; and
   providing investigative leads resulting from incorporation of the gathered information from any accessed social media accounts into the centralized investigative data aggregation and analysis system to users of the multiple controlled-environment facility investigative data aggregation and analysis system.

22. The method of claim 13, wherein the investigative leads resulting from the aggregated data are made available to the users via a web-based interface of the multiple controlled-environment facility investigative data aggregation and analysis system.

23. The method of claim 13, wherein the at least one social media account of the resident or non-resident includes at least one of a blog, business network, enterprise social network, forum, microblog, photo sharing, group message, message, location check-in, status update, product and/or service review, social bookmarking, social gaming, social network, video sharing, virtual world and/or tag.

24. A tangible non-transitory computer-readable storage medium having program instructions stored thereon that, upon execution by a multiple controlled-environment facility investigative data aggregation and analysis system, cause the system to:
   receive at least one captured telephone number of a controlled-environment facility resident and/or at least one non-resident associated with the resident;
   access at least one social media account of the resident or a non-resident using a captured telephone number;
   gather information related to the resident from at least one accessed social media account;
   incorporate gathered information into the multiple controlled-environment facility investigative data aggregation and analysis system;

analyze resulting aggregated data to derive investigative leads; and provide the investigative leads to users of the multiple controlled-environment facility investigative data aggregation and analysis system.

\* \* \* \* \*